June 29, 1926.
J. B. SECHRIST
PACKING BOLT FOR CRATING BEDS
Filed March 19, 1924
1,590,257
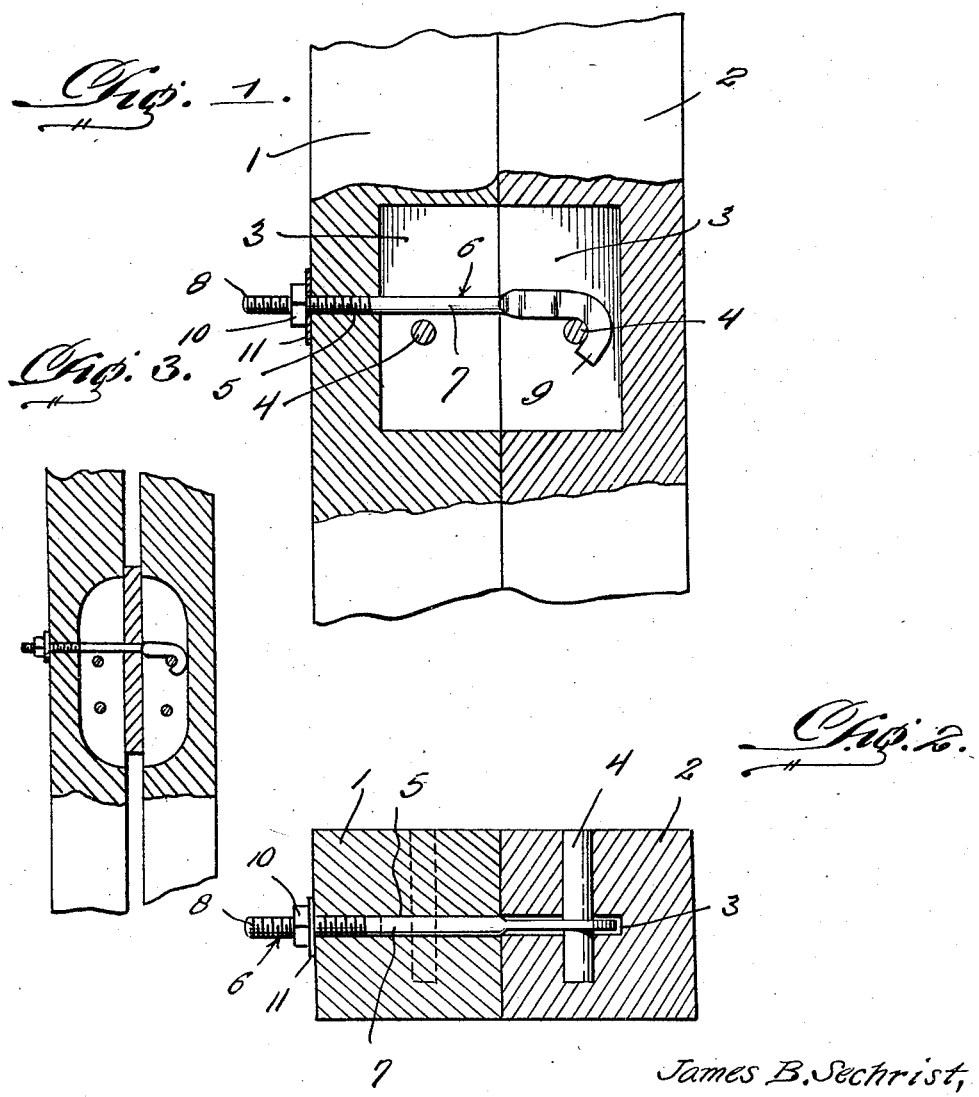
James B. Sechrist,
Inventor
By Clarence A. O'Brien
Attorney Patented June 29, 1926.

1,590,257

UNITED STATES PATENT OFFICE.

JAMES B. SECHRIST, OF RED LION, PENNSYLVANIA.

PACKING BOLT FOR CRATING BEDS.

Application filed March 19, 1924. Serial No. 700,348.

This invention relates to means for crating beds, and particularly to packing bolts adapted for cooperation with the portions of the bed structure, An object of the invention resides in providing a crating means for beds, wherein the bed structure includes head and foot portions or sections having posts formed with slots, provided with transversely extending hook pins adapted to receive the hook extensions on the plates carried by the side boards, when the bed is in assembled relation, hook members being provided having shank portions formed at one end with a hook, and threaded at the opposite end, the shank portions being adapted for insertion through an opening aligned with each slot in one section of the bed, while the hooks engage the hook pins of the other section of the bed, so that nuts threaded on the ends of the shank portion are adapted to draw the two sections into rigid contact for crating the same, ready for shipment.

The invention also comprehends other objects and improvements in the details of construction, and arrangement of parts, which are more particularly hereinafter described in the following description and claim, directed to the preferred form of the invention, it being understood, however, that other forms of securing means may be used, which will come within the scope of the invention as described and claimed.

In the drawing, forming a part of this application:

Figure 1 illustrates a vertical sectional view, through the posts of a pair of assembled or crated bed sections.

Figure 2 is a horizontal sectional view, through the portion of the post formed with the slot and containing the hook pin.

1 indicates one of the posts of the head section of a bed, and 2, one of the posts of the foot section of a bed, each formed in opposed faces with slots 3, which are adapted to receive the hook extensions of the plates carried by the side boards, when the bed is in assembled relation, which hook extensions engage over hook pins 4 mounted in the posts 1 and 2, and extending transversely through the slots 3 of each post, as more clearly shown in Figure 2 of the drawings.

In the present invention, the posts of the head section of the bed, as indicated at 1, are provided with bores 5, slightly above the transverse pin 4, and extending through the post in line with the slots 3. Hook members, indicated at 6, have shank members 7, of rod like form, threaded as indicated at 8, on one end portion, and provided with flattened hook portions 9 extending from the other end portion, the shank 7 being adapted for insertion in the bore 5, in the posts of the head section of the bed, while the hook 9 is adapted for insertion over the transverse pin 4, within the slot, in the foot section of the bed, as clearly shown in the drawing, so that when the bolt 10 is threaded on the portion 8 of the hook member, against the washer 11, the two sections will be drawn together into tight contact, so that the bed sections may be conveniently shipped from place to place in this crated relation, and movement between the sections will be prevented, which would injure the finish on the surface.

In crating bed sections under present practice, it is usually necessary to place felt packing or other stuffing between the bed sections, in crating them, in order to prevent injury to the finish on the surfaces, due to relative vibration in shipment, but it will be readily appreciated from the construction shown in the drawing and described above, that all of this packing may be eliminated, and the sections held in rigid relation, by the simple means of the hook member 6 cooperating with portions of the bed structure to hold the two sections in rigid contact, in order that jarring or rubbing movement between the sections may be prevented, and all packing eliminated.

If desired, a block 12 of wood or the like, having an opening for the shank 7 of the hook member may be placed between the sections of the bed as shown in Figure 3.

What is claimed is:

Means for crating a bed to adapt the same for safe shipping, wherein the bed embodies head and foot sections, each section having a pair of end-posts, the opposed faces of the corresponding ones of which are provided with opposite recesses, cross-pins in the recesses; and a single fastening and connecting device for each pair of end posts, each device comprising a hook connected to the cross pin in one post of the pair with which it cooperates, a shank, and adjustable clamping means on the shank, the remaining post of said pair having a hole extending from the coacting recess through one side, said shank passing through the hole, and the clamping means bearing against said one side, whereby to permit the sections to be drawn toward each other and securely connected together.

In testimony whereof I affix my signature.

JAMES B. SECHRIST.